United States Patent
Sigurbjörnsson et al.

(10) Patent No.: US 8,046,361 B2
(45) Date of Patent: Oct. 25, 2011

(54) SYSTEM AND METHOD FOR CLASSIFYING TAGS OF CONTENT USING A HYPERLINKED CORPUS OF CLASSIFIED WEB PAGES

(75) Inventors: Börkur Sigurbjörnsson, Catalunya (ES); Roelof van Zwol, Catalunya (ES); Simon E. Overell, London (GB)

(73) Assignee: Yahoo! Inc., Sunnyvale, CA (US)

( * ) Notice: Subject to any disclaimer, the term of this patent is extended or adjusted under 35 U.S.C. 154(b) by 433 days.

(21) Appl. No.: 12/106,202

(22) Filed: Apr. 18, 2008

(65) Prior Publication Data

US 2009/0265315 A1    Oct. 22, 2009

(51) Int. Cl.
*G06F 17/30* (2006.01)

(52) U.S. Cl. ........ 707/737; 707/752; 707/753; 707/754; 707/673; 707/696; 707/758; 707/759; 707/711; 707/770; 707/830; 707/741; 707/742; 707/743; 707/744; 707/745; 707/746

(58) Field of Classification Search ................. 707/711, 707/737, 752–754, 673, 696, 758–759, 770, 707/830, 741–746

See application file for complete search history.

(56) References Cited

U.S. PATENT DOCUMENTS

| | | | |
|---|---|---|---|
| 6,711,585 B1* | 3/2004 | Copperman et al. ................ | 1/1 |
| 7,028,250 B2* | 4/2006 | Ukrainczyk et al. ......... | 715/202 |
| 7,047,236 B2* | 5/2006 | Conroy et al. .................... | 1/1 |
| 7,275,063 B2* | 9/2007 | Horn ................................ | 1/1 |
| 2002/0022956 A1* | 2/2002 | Ukrainczyk et al. ............ | 704/9 |
| 2002/0065857 A1* | 5/2002 | Michalewicz et al. ....... | 707/532 |
| 2002/0178223 A1* | 11/2002 | Bushkin ........................ | 709/205 |
| 2004/0139059 A1* | 7/2004 | Conroy et al. .................... | 707/3 |
| 2004/0205499 A1* | 10/2004 | Gupta ........................ | 715/501.1 |
| 2004/0216057 A1* | 10/2004 | Wyle et al. ..................... | 715/810 |
| 2004/0236725 A1* | 11/2004 | Amitay et al. .................... | 707/3 |
| 2005/0246410 A1* | 11/2005 | Chen et al. .................... | 709/200 |
| 2006/0117002 A1* | 6/2006 | Swen ................................ | 707/4 |
| 2006/0143175 A1* | 6/2006 | Ukrainczyk et al. ............. | 707/6 |
| 2007/0233563 A1* | 10/2007 | Takahashi et al. ............. | 705/14 |
| 2007/0233777 A1* | 10/2007 | Bates et al. .................... | 709/202 |
| 2007/0244892 A1* | 10/2007 | Narancic .......................... | 707/7 |
| 2008/0040389 A1* | 2/2008 | Seth et al. .................. | 707/104.1 |
| 2008/0056575 A1* | 3/2008 | Behm et al. ................... | 382/180 |
| 2008/0071929 A1* | 3/2008 | Motte et al. ................... | 709/246 |
| 2008/0201302 A1* | 8/2008 | Kimchi et al. .................... | 707/3 |
| 2008/0281807 A1* | 11/2008 | Bartlang et al. .................. | 707/5 |
| 2009/0119284 A1* | 5/2009 | Chen et al. ....................... | 707/5 |
| 2009/0144605 A1* | 6/2009 | Radakovic et al. ........... | 715/200 |
| 2009/0265363 A1* | 10/2009 | Lai et al. ....................... | 707/100 |
| 2010/0241623 A1* | 9/2010 | Acker et al. .................. | 707/724 |

* cited by examiner

*Primary Examiner* — Frantz Coby

(74) *Attorney, Agent, or Firm* — Buchenhorner Patent Law

(57) ABSTRACT

An improved system and method for classifying tags of content using a hyperlinked corpus of classified web pages is provided. An anchor text index may be searched to find anchor texts that may match text of the tag, documents referenced by the matching anchor texts may be found, and the documents referenced by the matching anchor texts may be grouped to disambiguate multiple classifications that result from matching the anchor texts with the categories of the reference documents. To resolve ambiguity between multiple classifications, weighted classifications may be used where each document may be assigned a positive weight for a mapping to a category to indicate the confidence of the classification of the document to the category. The classification for the grouping of the documents referenced by the matching anchor texts with greatest frequency may be selected and output as the classification for the tag.

18 Claims, 4 Drawing Sheets

SYSTEM AND METHOD FOR CLASSIFYING TAGS OF CONTENT USING A HYPERLINKED CORPUS OF CLASSIFIED WEB PAGES

FIELD OF THE INVENTION

The invention relates generally to computer systems, and more particularly to an improved system and method for classifying tags of content using a hyperlinked corpus of classified web pages.

BACKGROUND OF THE INVENTION

The collaborative efforts of users participating in social media services such as Wikipedia, Flickr, and Delicious have led to an explosion in user-generated content. The content can occur in various forms, such as text, photos, video, audio, or multimedia content. A popular way of organizing the content is through tagging. In fact, a considerable amount of such content is labeled by user-defined tags. The tags provided by the user provide useful descriptors of the content, especially in the case of multimedia. Although informal tagging conventions have emerged, tagging does not restrict the user in any way when defining labels for describing content. The extensive freedom users enjoy allows for accurate descriptions and organization of content. The flexibility of such a tagging mechanism allows users to index and navigate the large amount of content that is being generated.

As a consequence, user-defined tags of content have likewise resulted in explosive growth. This imposes the problem of semantically categorizing and exploring a potentially infinite tag space. Any such endeavor is complicated by the practice of unrestricted labeling of content by users that has resulted in the emergence of an uncontrolled vocabulary that by far exceeds the semantics of a hierarchical ontology or taxonomy such as WordNet. The lack of a pre-defined schema makes the task of semantically exploring this immense and sparse tag space even more difficult.

Current solutions to word sense disambiguation involve using the context that terms occur in. In tag corpora, there is often minimal context making these methods inappropriate. See, for example, N. Ide and J. Vacronis, *Word Sense Disambiguation: The State of the Art*, Computational Linguistics, 24(1). Moreover, such an approach to mapping the user-defined tags upon an existing taxonomy does not scale to the vast vocabularies that exist within web-based services such as Flickr and Delicious.

What is needed is a way to classify user-defined tags of content for semantically exploring the corpora of user-defined tags. Such a system and method should be able to flexibly use a classification schema that may scale to the vast vocabularies that exist within web-based services.

SUMMARY OF THE INVENTION

The present invention provides a system and method for classifying tags of content using a hyperlinked corpus of classified web pages. A tag classification engine may be provided for classifying a tag with a category. The set of possible categories may be taken from a classified corpus of hyperlinked web documents. The tag classification engine may be operably coupled to an anchor text search engine for searching an anchor text index to find anchor texts in the classified corpus of hyperlinked web documents that match the text of the tag. Documents referenced by the matching anchor texts may then be found in the classified corpus of hyperlinked web documents. The tag classification engine may also be operably coupled to a disambiguation engine for resolving ambiguities in the classification of the documents by grouping the documents referred by the anchor texts matching the text of the tag. A classification category may be selected and output from the grouping of the documents referenced by the anchor texts.

In an embodiment for classifying a tag associated with content, an anchor text index may be searched to find anchor texts in the classified corpus of hyperlinked web documents that may match text of the tag, documents referenced by the matching anchor texts may be found in the classified corpus of hyperlinked web documents, and the documents referenced by the matching anchor texts may be grouped in order to disambiguate multiple classifications that may result from matching the anchor texts with the categories of the reference documents in the classified corpus of hyperlinked web documents. In particular, a list of documents may be constructed where each document may be represented by a triplet of the document name, a classification category and a frequency. The frequency may represent the number of times the matched anchor text refers to the document. This list of documents may be grouped by category of the classification. To resolve ambiguity between multiple classifications, weighted classifications may be used where each document may be assigned a positive weight for a mapping to a category to indicate the confidence of the classification of the document to the category. The classification category for the grouping of the documents referenced by the matching anchor texts with greatest frequency may be selected and output as the classification category for the tag.

The present invention is extensible and may utilize any categorized hyper-linked resources to accurately determine the classification of a tag. Moreover, multiple classification schemas may be used. Any categorized corpus of documents may be used to create default broad categories for each term that may appear in a tag. Other advantages will become apparent from the following detailed description when taken in conjunction with the drawings, in which:

DETAILED DESCRIPTION

Exemplary Operating Environment

Figure 1:
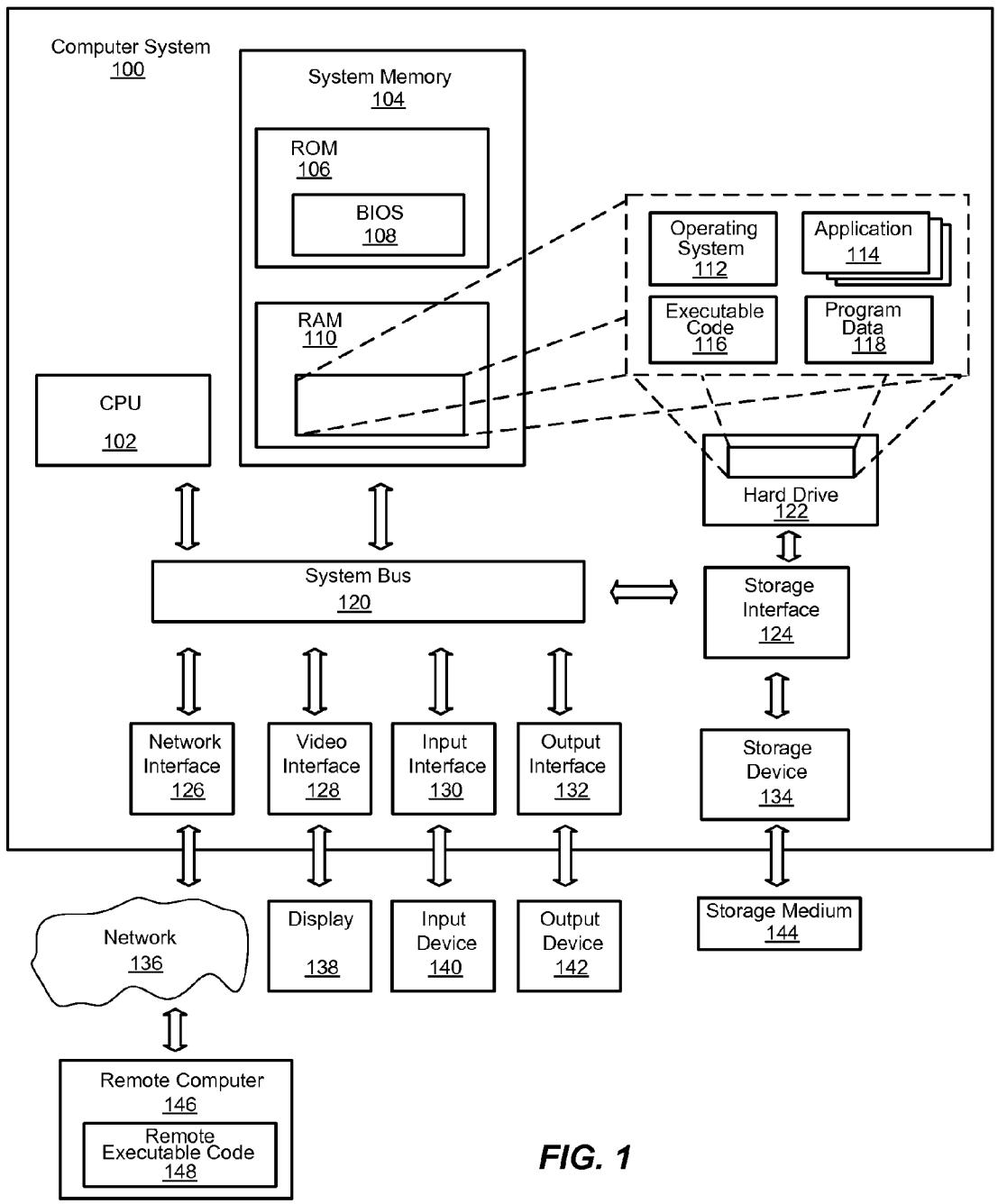
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data.

For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, non-volatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Classifying Tags of Content Using a Hyperlinked Corpus of Classified Web Pages The present invention is generally directed towards a system and method for classifying tags of content using a hyperlinked corpus of classified web pages. An anchor text index may be searched to find anchor texts in a classified corpus of hyperlinked web documents that may match text of the tag. Anchor texts matching the text of the tag may be mapped to documents referenced by the anchor texts in the classified corpus of hyperlinked web documents. The list of documents referred by the anchor texts matching the text of the tag may be grouped by their classification in order to reduce ambiguity. And the tag may be classified as the most frequently occurring classification of the clustered documents referred by the anchor texts.

As will be seen, the present invention may be generally applied to systematically generate categorized tags of any collection of tagged content using any classified corpus of hyperlinked documents. Additionally, the framework provided may support different classification schemas, including mixed or hybrid classification schemas. As will be understood, the various block diagrams, flow charts and scenarios described herein are only examples, and there are many other scenarios to which the present invention will apply.

Figure 2:
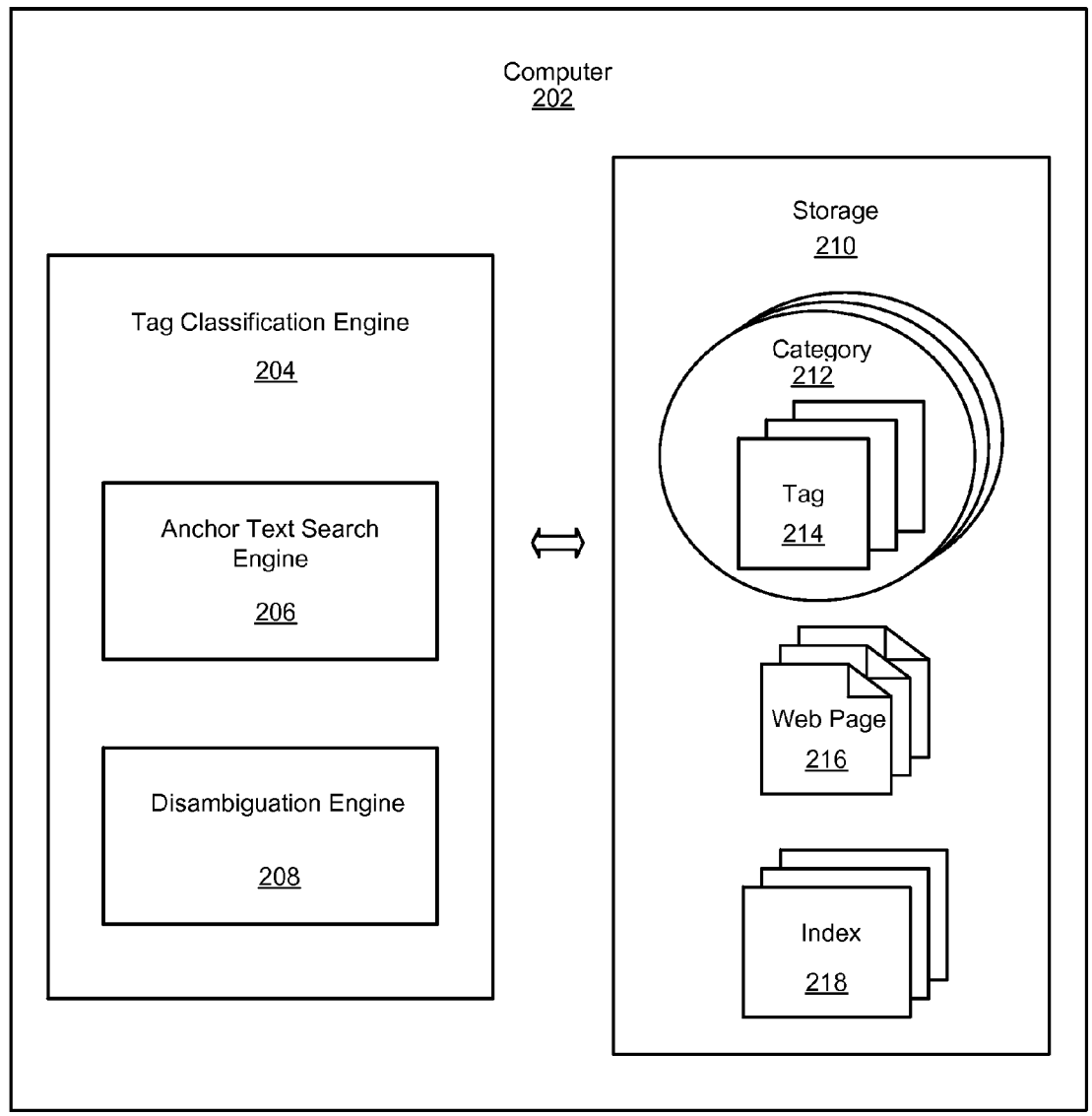
FIG. 2 is a block diagram generally representing an exemplary architecture of system components for classifying tags of content using a hyperlinked corpus of classified web documents, in accordance with an aspect of the present invention.

Turning to FIG. 2 of the drawings, there is shown a block diagram generally representing an exemplary architecture of system components for classifying tags of content using a hyperlinked corpus of classified web pages. Those skilled in the art will appreciate that the functionality implemented within the blocks illustrated in the diagram may be implemented as separate components or the functionality of several or all of the blocks may be implemented within a single component. For example, the functionality for the anchor text search engine 206 may be implemented as a component within the tag classification engine 204 as shown. Or the functionality of the anchor text search engine 206 may be implemented as a separate component from the tag classification engine 204. Moreover, those skilled in the art will appreciate that the functionality implemented within the blocks illustrated in the diagram may be executed on a single computer or distributed across a plurality of computers for execution.

In various embodiments, a computer 202, such as computer system 100 of FIG. 1, may include a tag classification engine 204 operably coupled to storage 210. In general, the tag classification engine 204 may be any type of executable software code such as a kernel component, an application program, a linked library, an object with methods, and so forth. The storage 210 may be any type of computer-readable media and may store categories 212 of tags 214 associated with content of a web page 216, or links to web pages such as URLs. The text of tags 214 may be used to search an index 218 of anchor text to find anchor texts in a classified corpus of hyperlinked web documents that may match the text of the tag. Examples of a classified corpus of hyperlinked web documents may be a tagged listing of the Open Directory, Wikipedia, WordNet, and so forth.

The tag classification engine 204 may classify tags of content using a hyperlinked corpus of classified web pages. The tag classification engine 204 may include an anchor text search engine 206 for searching an anchor text index to find anchor texts in the classified corpus of hyperlinked web documents that match the text of the tag. The tag classification engine 204 may also include a disambiguation engine 208 for resolving ambiguities between the classification of documents by grouping documents referred to by matching anchor texts by category and classifying the tag as the most frequently occurring category of the clustered documents referred by the anchor texts. Each of these modules may also be any type of executable software code such as a kernel component, an application program, a linked library, an object with methods, or other type of executable software code. Upon classifying the tag, a classification may be output for the tag associated with the content of the web document.

The current implementation of this method is extensible, such that any categorized hyper-linked resources may be used to accurately determine the classification of a tag. Moreover, the method is not bound to a single classification schema. The schema can be exchanged, or even used in a mixed form. Any categorized external corpus may be used to create default broad categories for each term that may appear in a tag. It is important to note that ambiguity may be significantly reduced by using broad categories.

In general, tags may be mapped to web resources by matching anchor texts. More particularly, tags may be matched to documents of a classified corpus, and ambiguity may be reduced by clustering all documents with the same classification. In an implementation, an API may be used that provides the ranked classifications for a tag from three resources: a tagged dump of the Open Directory, a tagged dump of Wikipedia, and WordNet. For example, a classified dump of Wikipedia may be used in an embodiment to classify a sample of a corpus of tagged images such as Flickr. The categories used in the classification may be, for instance, the noun syntactic broad categories of WordNet.

In various implementations, there may be unique classifications where each document has exactly one classification, multiple classifications where each document has at least one classification, and weighted classifications where each document is assigned a positive weight for each class indicating the confidence of the class.

Figure 3:
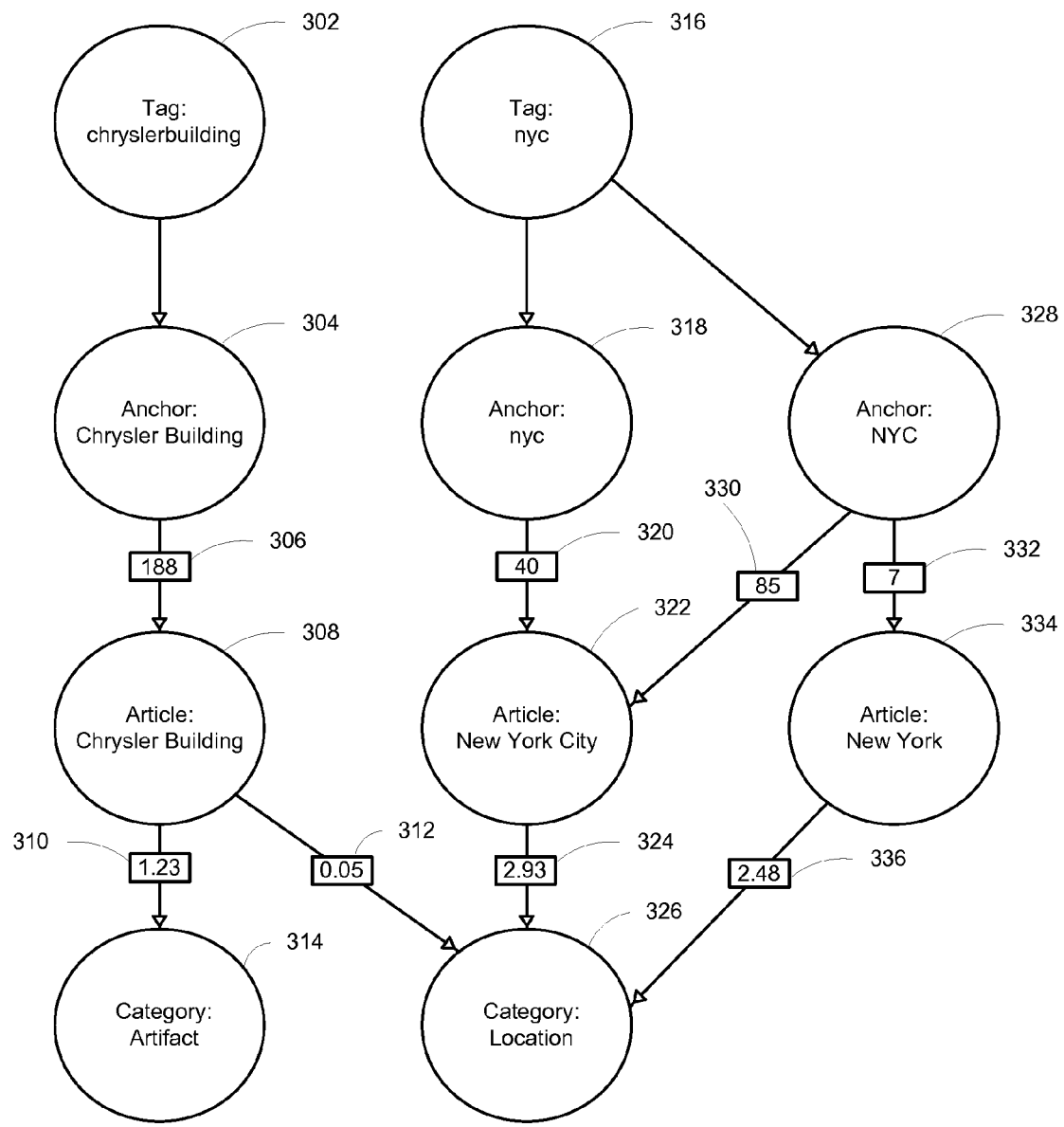
FIG. 3 is an illustration depicting in an embodiment a logical mapping of text of a tag to a category from a hyperlinked corpus of classified web documents, in accordance with an aspect of the present invention.

For instance, an image from Flickr may have two tags: "chryslerbuilding" and "nyc". FIG. 3 shows an illustration of a logical mapping of these two tags to categories from a hyperlinked corpus of classified web documents. FIG. 3 generally represents mappings from tag to anchor text, anchor text to document, and document to category. For instance, the tag "chryslerbuilding" 302 may map to the anchor text "chrysler building" 304 in an anchor text index of documents in a classified corpus. The anchor text "chrysler building" 304 may map to a document "Chrysler Building" 308. The document may map to the category of artifact 314. Note that the document "Chrysler Building" 308 may also map to the category of location 326. The tag "nyc" 316 may map to the anchor text "nyc" 318 in an anchor text index of documents in a classified corpus. The anchor text "nyc" 318 may map to a document "New York City" 322. The document may map to the category of location 326. The tag "nyc" 316 may also map to the anchor text "NYC" 328 in an anchor text index of documents in a classified corpus. The anchor text "NYC" 328 may map to a document "New York City" 322 and a document "New York" 334. Both of these documents may map to the category of location 326.

In an embodiment, there may be weights assigned to the mapping between the anchor text and the documents, as well as between the documents and the categories. The weights assigned to the mapping between the anchor text and the documents may represent the frequency the matched anchor text refers to the document. For instance, the weight 306 assigned between the anchor text "chrysler building" 304 and the document "Chrysler Building" 308 is 188, which may mean that the anchor text "chrysler building" 304 appears 188 times in links referring to the document "Chrysler Building" 308. Similarly, the weight 320 assigned between the anchor text "nyc" 318 and the document "New York City" 322 is 40. Note that there are two weights assigned, one for each of the mappings, from the anchor text "NYC" 328 to the documents "New York City" and "New York". The weight 330 assigned between the anchor text "NYC" 328 and the document "New York City" 322 is 85, and the weight 332 assigned between the anchor text "NYC" 328 and the document "New York" 334 is 7.

And the weights assigned to the mapping between the documents and the categories may represent in an embodiment a measure of the confidence that the document is accurately classified in the assigned category. Thus, the weight 310 of 1.23 assigned to the mapping between the document "Chrysler Building" 308 and the category of artifact 314 indicates a higher confidence measure that the document is accurately classified as an artifact than the weight 312 of 0.05 assigned to the mapping between the document "Chrysler Building" 308 and the category of location 326. In the case of the documents "New York City" 322 and "New York" 334, the weight 324 of 2.93 and the weight 336 of 2.48 respectively assigned to the mapping of the category of location 326 indicate confidence measures that each of the documents is accurately classified as a location.

There may be cases of unique classifications where each document may have exactly one classification. Often multiple classifications may occur where a document may have more than one classification. Such may be the case for the mapping of the document "Chrysler Building" 308 that may be classified as an artifact and a location. To resolve ambiguity between multiple classifications, weighted classifications may be used where each document may be assigned a positive weight for a mapping to a category to indicate the confidence of the classification of the document to the category. Thus, the weight 310 of 1.23 assigned to the mapping between the document "Chrysler Building" 308 and the category of artifact 314 indicates a higher confidence measure that the document is accurately classified as an artifact than the weight 312 of 0.05 assigned to the mapping between the document "Chrysler Building" 308 and the category of location 326.

Figure 4:
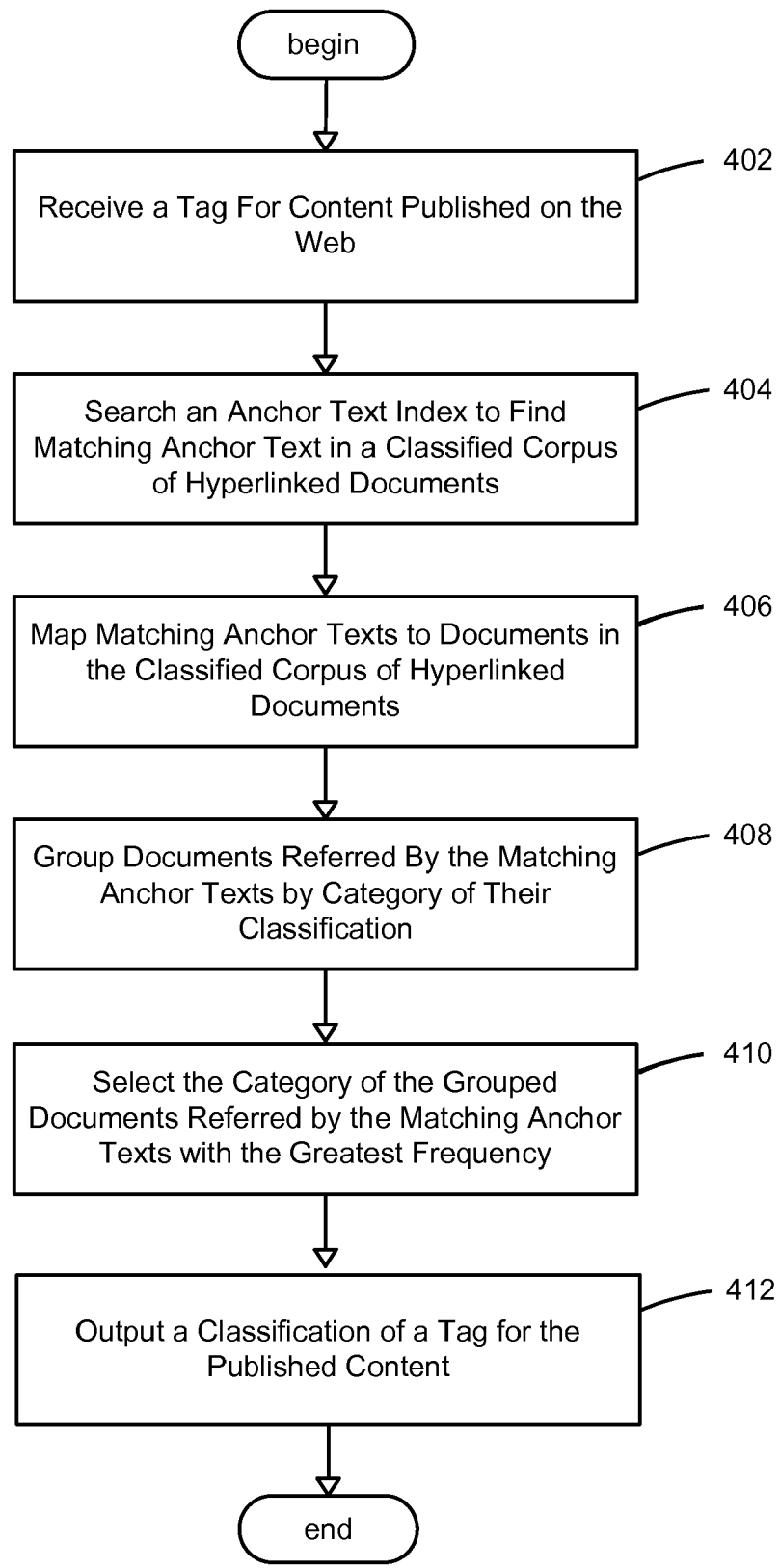
FIG. 4 is a flowchart generally representing the steps undertaken in one embodiment for classifying tags of content using a hyperlinked corpus of classified web pages, in accordance with an aspect of the present invention.

FIG. 4 presents a flowchart generally representing the steps undertaken in one embodiment for classifying tags of content using a hyperlinked corpus of classified web pages. At step 402, a tag associated with content of a web document may be received. An anchor text index may be searched at step 404 to find an anchor text in a classified corpus of hyperlinked web documents that may match text of the tag. In an embodiment, the tag may be matched to lower-cased anchor texts in the anchor text index with white space and punctuation removed.

At step 406, anchor text matching the text of the tag may be mapped to documents by finding documents referenced by the anchor text in a classified corpus of hyperlinked web documents. In an embodiment, anchor text matching the text of the tag may be mapped to a document if the anchor text may refer to the document more than 4 times. On average, each anchor text may map to more than one document in a classified corpus of hyperlinked web documents. To reduce the complexity of the problem, anchor text referring to a document less than 5 times may be excluded in an embodiment since a mapping that represents a low frequency may introduce ambiguity. A further embodiment reduces ambiguity by excluding documents which make less than 5% of the total mappings from a specific anchor as this may also introduce ambiguity. A list of documents corresponding to matching anchor texts may be constructed where each document may be represented by a triple: the document name, the category and the frequency. The frequency may represent the number of times the matched anchor text appears in links referring to the document.

At step 408, the list of documents found in the classified corpus of hyperlinked web documents referred by anchor text that may match text of the tag may be grouped by category of the classification. In an embodiment, the list of documents may be clustered to construct a list of categories with a maximum of one entry per category. Each category in the list may be represented by a tuple: a category and a frequency. In an embodiment, the frequency may represent the sum of the frequencies of all documents in the document list with the corresponding category.

At step 410, the category of the grouped documents referred by anchor texts with the greatest frequency in the classified corpus of hyperlinked web documents may be selected. And a classification may be output at step 412 for the tag associated with the content of the web document.

Thus the present invention may automatically classify user-defined tags to allow semantic exploration of an immense and sparse tag space. The solution may provide an organizational schema that supports extensive freedom for accurate descriptions of user-defined content. Moreover, the framework provided may support different classification schemas, including mixed or hybrid classification schemas. Importantly, ambiguity may be reduced in mapping user-defined tags to categories by clustering referenced documents in the classified corpus with the same category and classifying the user-defined tag as the most commonly referred to category.

As can be seen from the foregoing detailed description, the present invention provides an improved system and method for classifying tags of content using a hyperlinked corpus of classified web pages. Anchor texts matching the text of a tag may be mapped to documents by finding documents referenced by the anchor texts in a classified corpus of hyperlinked web documents. The list of documents referred by anchor texts that may match text of the tag may be grouped by classification, and the tag may be classified as the most frequently occurring classification of the clustered documents referred by the anchor texts. By clustering the documents by classification, ambiguity may be significantly reduced. Advantageously, the system and method of the present invention may be generally applied to systematically generate categorized tags of any collection of tagged content using any classified corpus of hyperlinked documents. As a result, the system and method provide significant advantages and benefits needed in contemporary computing, and more particularly in online applications supporting user-defined content.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for classifying a tag associated with content, comprising:
    a tag classification engine for classifying a tag associated with content of a web document with a category associated with one or more documents in a classified corpus of hyperlinked web documents referred by one or more anchor texts matching the text of the tag;
    a storage operably coupled to the tag classification engine for storing a plurality of categories of tags classified with the category associated with one or more documents in the classified corpus of hyperlinked web documents referred by the one or more anchor texts matching the text of the tag, said storage comprising the classified corpus of hyperlinked web documents;

an anchor text index searchable to find anchor texts in the classified corpus of hyperlinked web documents that match text of the tag; and an anchor text search engine operably coupled to the tag classification engine configured to perform:

searching the anchor text index to find the one or more anchor texts in the classified corpus of hyperlinked web documents that match the text of the tag, in order to disambiguate multiple classifications that result from matching the anchor texts with the categories of the reference documents in the classified corpus of hyperlinked web documents;

reducing ambiguity by:

clustering all documents with a same classification; and excluding documents accounting for less than five percent of total mappings from a specific anchor.

2. The system of claim 1 further comprising a disambiguation engine operably coupled to the tag classification engine for resolving ambiguities in the classification of the one or more documents by grouping the one or more documents referred by the one or more anchor texts matching the text of the tag.

3. The system of claim 1 wherein the storage further comprises an anchor text index of a plurality of anchor texts referring to a plurality of documents in the classified corpus of hyperlinked web documents.

4. A computer-implemented method for classifying a tag associated with content, comprising:

matching text of a tag associated with content of a web document with one or more anchor texts in a classified corpus of hyperlinked web documents, in order to disambiguate multiple classifications that result from matching the anchor texts with the categories of the reference documents in the classified corpus of hyperlinked web documents and ambiguity is reduced by clustering all documents with the same classification;

finding one or more documents referenced by the one or more anchor texts in the classified corpus of hyperlinked web documents by searching an anchor text index;

grouping the one or more documents by one or more classifications;

selecting a classification associated with the grouping of the one or more documents referenced by the one or more anchor texts; and outputting the classification for the tag associated with the content of the web document;

wherein the matching, finding, grouping, and selecting steps are performed by a computer processing device; and wherein the outputting step is performed by an output device operably coupled with the computer processing device.

5. The method of claim 4 further comprising receiving the tag associated with content of the web document.

6. The method of claim 4 further comprising searching an anchor text index to find the one or more anchor texts in the classified corpus of hyperlinked web documents that match text of the tag.

7. The method of claim 4 further comprising constructing a list of the one or more documents represented as a triplet of a document name, a category and a frequency.

8. The method of claim 4 wherein selecting the classification associated with the grouping of the one or more documents referenced by the one or more anchor texts comprises selecting the classification associated with the grouping of the one or more documents referenced by the one or more anchor texts with greatest frequency.

9. The method of claim 4 wherein finding one or more documents referenced by the one or more anchor texts in the classified corpus of hyperlinked web documents comprises finding one or more documents referenced more than four times by the one or more anchor texts in the classified corpus of hyperlinked web documents.

10. The method of claim 4 wherein grouping the one or more documents by one or more classifications comprises constructing a list of categories with each category in the list represented by a tuple of the category and a sum of the frequencies of the one of more documents classified in the category referenced by the one or more anchor texts.

11. The method of claim 4 wherein matching text of a tag associated with content of a web document with one or more anchor texts in a classified corpus of hyperlinked web documents comprises normalizing the one or more anchor texts by removing white space and converting characters to lower case.

12. The method of claim 4 wherein matching the text of the tag associated with content of the web document with one or more anchor texts in the classified corpus of hyperlinked web documents comprises matching the text of the tag in a tagged listing of a corpus of hyperlinked web documents.

13. The method of claim 12 further comprising generating the tagged listing of the corpus of hyperlinked web documents.

14. A non-transitory computer-readable medium having computer-executable instructions for performing the method of claim 4.

15. A computer system for classifying a tag associated with content, comprising:

a computer processing device performing steps of:

searching an anchor text index to find one or more anchor texts in a classified corpus of hyperlinked web documents;

matching text of a tag associated with content of a web document with the one or more anchor texts in the classified corpus of hyperlinked web documents, in order to disambiguate multiple classifications that result from matching the anchor texts with the categories of the reference documents in the classified corpus of hyperlinked web documents wherein ambiguity is reduced by clustering all documents with the same classification; and matching the one or more anchor texts with one or more categories of one or more documents in the classified corpus of hyperlinked web documents;

reducing ambiguity by:

clustering all documents with a same classification; and excluding documents accounting for less than five percent of total mappings from a specific anchor; and an output device operably coupled with the computer processing device, said output device outputting at least one classification for the tag associated with the content of the web document.

16. The computer system of claim 15 wherein the computer processing device is further configured to perform a step of finding the one or more documents referenced by the one or more anchor texts in the classified corpus of hyperlinked web documents.

17. The computer system of claim 15 wherein the computer processing device is further configured to perform a step of reducing ambiguity in selecting at least one classification category from matching the one or more anchor texts with one or more categories of one or more documents in the classified corpus of hyperlinked web documents.

18. The computer system of claim 17 wherein the computer processing device is further configured to perform a step of selecting at least one classification associated with the one or more documents referenced by the one or more anchor texts.

* * * * *